United States Patent Office 3,431,093
Patented Mar. 4, 1969

3,431,093
INSTANT-IGNITING CHARCOAL
Jerry M. Kreinik, Parkersburg, W. Va., assignor to FMC Corporation, New York, N.Y., a corporation of Delaware
No Drawing. Filed Jan. 10, 1967, Ser. No. 608,283
U.S. Cl. 44—6            5 Claims
Int. Cl. C10l 9/10

ABSTRACT OF THE DISCLOSURE

An instant-igniting product is made by treating charcoal with a mixture of 20 to 95% of saturated higher alcohols whose carbon chains contain 12–18 carbon atoms and 5 to 80% of saturated higher carboxylic acids whose carbon chains contain 12–18 carbon atoms. The appearance and ease of ignition of the treated charcoal can be improved by applying a flammable polymer coating which also makes the treated charcoal completely clean handling. The addition of a small amount of nitrocellulose to the saturated higher alcohol and carboxylic acid treating mixture makes a harder coating on the charcoal that is easier to ignite than similar coatings which do not contain nitrocellulose.

BACKGROUND OF THE INVENTION

Field of the invention

Instant-igniting charcoal.

Description of the prior art

A commonly used method of igniting charcoal is to saturate the charcoal with a solvent such as benzene, kerosene, methyl alcohol, and the like, and ignite the solvent-saturated charcoal. This method of igniting charcoal is rather dangerous as the solvent can flash and flame-up upon ignition.

It is desirable to produce instant-igniting charcoal which may be ignited with a match or other simple igniting device, which is clean handling, ignites easily, and after ignition does not emit objectionable smoke and odors. It has been suggested that briquettes composed of charcoal and citrus hulls, and charcoal briquettes containing oxidizable compounds such as potassium nitrite and coated with a cellulose lacquer, are easy to ignite. However, both of these types of charcoal briquettes emit such objectionable odorous smoke that they have not been acceptable to the using public.

Charcoal briquettes which are saturated with kerosene or benzene are available in plastic bags or other vapor-proof containers; however, the container must be kept tightly closed to retain the igniting fluid. These briquettes are wet and unpleasant to handle. Moreover, upon ignition these charcoal briquettes burn with the emission of odorous smoke so that they too have not proven commercially acceptable.

Charcoal molded in pulp paper board containers such as egg box type cartons, saturated with wax to promote easy ignition and combustion, are easily ignitable. Easily ignitable, wax coated charcoal briquettes are also available. Upon ignition, these wax coated charcoal products produce a large amount of black smoke accompanied by most unpleasant odors which continue until the wax coating is burned away. Hence, these materials too have failed to obtain consumer acceptance.

An improved instant-igniting charcoal is described in United States patent application Ser. No. 591,422, filed Nov. 2, 1966, which describes charcoal which is made instant-igniting by impregnating the charcoal with an alcohol-polymer solution, then gelling the impregnating solution by immersing the impregnated charcoal in water and coating the charcoal with a flammable polymer coating. The disadvantage of this improved instant-igniting charcoal is that it uses lower aliphatic alcohols containing 1–3 carbon atoms in the alcohol; the volatility of these alcohols is such that the impregnated charcoal has to be stored in vapor tight containers.

Summary of the invention

I have discovered that charcoal can be made instant-igniting by treating it with a composition composed of a mixture of saturated higher alcohols whose carbon chains contain 12–18 carbon atoms, and saturated carboxylic acids whose carbon chains contain 12–18 carbon atoms. Charcoal treated with mixtures of these saturated higher alcohols and carboxylic acids ignites easily and burns with little or no smoke and a pleasant cooking-type odor.

Surprisingly neither the fatty alcohols or fatty acids alone were found to be completely suitable for making charcoal instant-igniting. Even addition of nitrocellulose to fatty alcohol or acid did not result in a satisfactory product.

Charcoal treating mixtures containing 20 to 95% by weight of fatty alcohol and 5 to 80% by weight of fatty acid are used to produce my instant-igniting charcoal. Treating mixtures containing more than 80% of fatty acid do not adequately penetrate the charcoal and produce weak, grainy, loosely adhering coatings that do not ignite easily. Treating mixtures containing less than 5% of fatty acid penetrate the charcoal so readily that excessive amounts of the fatty alcohol are absorbed.

Description of the preferred embodiments

In producing my instant-igniting charcoal, a mixture of the specified higher saturated alcohols and carboxylic acids is heated to a molten state. Charcoal is placed in the molten mixture and allowed to soak for a short period of time. Twelve to fifteen seconds of soaking is generally sufficient to properly treat charcoal briquettes; however, the time required depends upon the weight, size and form of the charcoal. The charcoal is then removed from the molten mixture and allowed to cool. The treated charcoal feels waxy but not unpleasant, and may be used as is. If it is desired to make it cleaner handling the treated charcoal is then briefly immersed in a polymer solution. After removal from the polymer solution the treated charcoal is heated to a temperature below the melting point of the ignitor mixture to remove the solvent. The product is clean handling and ignites as readily as the uncoated product.

The addition of a small amount, to constitute as much as about 15% of the weight of the charcoal treating mixture, of nitrocellulose to the saturated higher alcohol and carboxylic acid mixture makes a coating that is harder, and easier to ignite than the fatty alcohol-fatty acid coating without nitrocellulose. Considering the noxious odors of burning nitrocellulose it is surprising that small amounts of nitrocellulose can be added without trouble, and good results rather than bad are obtained.

Charcoal is treated with the three component ignitor mixture by immersing the charcoal in a solution containing the fatty alcohol, fatty acid and nitrocellulose. The solvent is removed from the treated charcoal by heating the charcoal for a short time at a temperature slightly below the melting point of the fatty alcohol-fatty acid-nitrocellulose mixture.

Loose charcoal and charcoal briquettes can be impregnated with the impregnating materials and methods of this invention; this loose charcoal can then be formed into charcoal briquettes or other molded shapes with excellent results.

The fatty alcohols useful in practicing this invention are principally those saturated aliphatic alcohols having a chain length of about 12 to 18 carbon atoms. These alcohols burn cleanly without emitting objectionable odorous smoke. These saturated aliphatic alcohols occur naturally in many products such as waxes and fats; therefore, their odors or the odors of the pyrolytic products derived from them are expected from foods prepared over an open grill and their odors and smoke are not offensive. Mixtures of saturated aliphatic primary alcohols are commercially available and for economic reasons these mixed alcohols are preferred in practicing this invention.

The principal saturated aliphatic carboxylic acids useful in practicing this invention have a chain length of about 12–18 carbon atoms. These saturated aliphatic acids occur naturally in many food products such as waxes and fats; therefore, their odors, or the odors of the pyrolytic products derived from them, are not offensive as these odors are expected when food is prepared over an open grill. Lauric, myristic, palmitic and stearic acids were evaluated and palmitic acid was judged to impart the best odor, although all of these acids were satisfactory.

Most of the commercially available nitrocellulose compounds containing 10–14% nitrogen and ordinarily used in lacquers are useful in the ignitor fluids of this invention. Nitrocellulose compounds which have a solution viscosity of ½ to 200 seconds, determined according to ASTM Method D–301–56, are preferred as these compounds give the best coatings. The nitrocellulose is used in an amount of as much as about 15% by weight. Use of much more tends to cause emission of noxious fumes when the charcoal is ignited.

The charcoal may be treated with a molten fatty alcohol-acid mixture by soaking in an open tank for a short period, often only 12–15 seconds. The treating may also be done in a closed tank in which pressure may be applied. The vacuum-pressure impregnation method may be used; in this method the charcoal is placed in a vacuum tank which is evacuated for a period of time, then the impregnating mixture is drawn into the tank by vacuum to a level which covers the charcoal, the vacuum is released and pressure applied for a short period of time. The preferred technique is simply immersing the charcoal in an open tank containing the molten fatty acid-alcohol mixture for a short period of time to obtain the desired pick-up of the ignitor material.

The amount of ignitor material required to make charcoal instant-igniting depends to some extent upon the surface area of the charcoal. Charcoal containing relatively large surface areas, such as loose charcoal and molded briquettes and blocks which contain a plurality of holes require impregnation with only about 9% by weight of the ignitor material to make the charcoal instant igniting. Smooth surface charcoal such as briquettes and blocks containing no indentations or holes require a pick up of at least about 10% by weight of the ignitor mixture to produce satisfactory instant-igniting charcoal briquettes and blocks.

The ingredients used to make charcoal instant-igniting according to this invention are not volatile, therefore, the treated charcoal can be stored for long periods of time in any type of container, including very porous containers such as burlap bags, untreated kraft paper bags, and the like, and the charcoal still ignites easily after long storage.

The following examples illustrating the novel products and methods disclosed herein for preparing instant-igniting charcoal are given without any intent that the invention be limited thereto. All parts and percentages are by weight.

Example I

Palmitic acid was mixed with a mixture of C–12 to C–15 saturated aliphatic alcohols (sold by Shell Chemical Company as Neodal 25) and heated together until a homogeneous melt was obtained. Charcoal was immersed in the melt for varying lengths of time to pick up and or absorb ignitor material. Upon removal from the melt, the fatty alcohol-fatty acid mixure hardened in about 5 seconds and was ready for coating. Nitrocellulose pulp was dissolved in acetone to yield a 25% solution. The treated charcoal was dipped into the acetone solution for several seconds, removed and the solvent flashed from the charcoal in an oven. The oven temperature was maintained below 65° C. to avoid melting the ignitor material. The formulations and results relating to the treated and coated charcoal are in Table I.

TABLE I.—TREATED AND COATED CHARCOAL BRIQUETTES

| Sample No. | Ratio of alcohol to acid | Treating time (sec.) | Percent alcohol acid add on [1] | Percent Nitrocellulose add on | Total added (percent) | Remarks |
|---|---|---|---|---|---|---|
| 1 | 93:7 | 20 | 27.5 | 1.9 | 29.4 | Burns well for 4 min., uniform ignition of char. |
| 2 | 75:25 | 15 | 22.2 | .8 | 23.0 | Burns well for 3 min., uniform ignition of char. |
| 3 [2] | 50:50 | 15 | 9.0 | 1.8 | 10.8 | Burns well for 2 min., uniform ignition of char. |
| 4 | 50:50 | 15 | 11.3 | 3.1 | 14.4 | Burns well for 5 min.. uniform ignition of char. |
| 5 | 50:50 | 17 | 15.3 | 3.0 | 18.3 | Burns well for 4 min., uniform ignition of char. |
| 6 | 50:50 | 17 | 15.5 | 1.7 | 17.2 | Burns well for 5 min., uniform ignition of char. |
| 7 | 50:50 | 18 | 14.6 | 2.2 | 16.8 | Burns well for 6 min., uniform ignition of char. |
| 8 | 50:50 | 10 | 7.7 | 1.0 | 8.7 | Burns for 1 min., edges only ignited. |
| 9 | 50:50 | 5 | 4.1 | 1.6 | 5.7 | Poor burning, no ignition of char. |
| 10 | 50:50 | 12 | 13.5 | 2.8 | 16.3 | Burns well for 4 min., uniform ignition of char. |
| 11 | 50:50 | 5 | 3.5 | 1.7 | 5.2 | Poor burning, no ignition of char. |
| 12 | 25:75 | 12 | 10.0 | 2.0 | 12.0 | Burns well. uniform ignition of char. |

[1] Percent add on is calculated on the weight of the untreated charcoal.
[2] This sample was repeated three times replacing palmitic acid with stearic acid, lauric acid and myristic acid with similar results.

Example 2

Palmitic acid, 45 parts; Neodal 25, 45 parts; and half second RS nitrocellulose, 10 parts; were dissolved in 90 parts by weight of acetone and blended to form a homogeneous solution. Charcoal was immersed in the solution for a short period. Acetone solvent was flashed from the treated briquette in an oven at below 65° C.

TABLE II.—ONE STEP CHARCOAL TREATMENT

| | No. 1 | No. 2 |
|---|---|---|
| Immersion time (sec.) | 20 | 10 |
| Dry add on (Percent) | 15.5 | 7.3 |
| Flame time (min.) | 5 | 1 |
| Remarks | (¹) | (²) |

¹ Burns completely.
² Edges only ignite.

Example 3

Example 1, sample 3, was repeated except that the nitrocellulose coating was not added on the treated charcoal. The treated charcoal had a waxy but not an unpleasant feel. The charcoal ignited easily when touched with a flame and burned well with a pleasant odor and little or no smoke.

As will be apparent to those skilled in the art, numerous modifiations and variations of the instant-igniting charcoal illustrated above may be made without departing from the spirit of the invention or the scope of the following claims.

What is claimed is:
1. Instant-igniting charcoal comprising charcoal treated with at least 9% by weight, based on the weight of the untreated charcoal, of a mixture of 20–95% by weight saturated aliphatic alcohol whose carbon chain contains 12 to 18 carbon atoms and 5 to 80% by weight saturated aliphatic carboxylic acid whose carbon chain contains 12 to 18 carbon atoms.
2. The instant-igniting charcoal of claim 1 in which the aliphatic alcohol is selected from the group consisting of n-lauryl alcohol, n-myristic alcohol, n-cetyl alcohol and n-stearyl alcohol.
3. The instant-igniting charcoal of claim 1 in which the saturated aliphatic carboxylic acid is selected from the group consisting of lauric acid, myristic acid, palmitic acid and stearic acid.
4. The instant-igniting charcoal of claim 1 wherein the charcoal treating mixture contains in addition to the alcohol and acid, as much as 15% of nitrocellulose by weight, based on the total weight of said mixture.
5. The instant igniting charcoal of claim 1 further comprising a flammable coating of nitrocellulose.

References Cited
UNITED STATES PATENTS

| | | | |
|---|---|---|---|
| 50,503 | 10/1865 | Smith | 44—41 |
| 159,001 | 1/1875 | Tisdale | 44—6 |
| 809,121 | 1/1906 | Lewy | 44—7.5 |
| 1,950,814 | 3/1934 | Pungs et al. | 44—7.5 |
| 1,960,994 | 5/1934 | Geller | 44—7.5 |
| 2,816,013 | 12/1957 | Powell | 44—6 |

DANIEL E. WYMAN, *Primary Examiner.*

CARL F. DEES, *Assistant Examiner.*

U.S. Cl. X.R.

44—41